United States Patent
Shiroishi (10) Patent No.: US 11,084,519 B2
(45) Date of Patent: Aug. 10, 2021

(54) STEERING DEVICE

(71) Applicant: YAMADA MANUFACTURING CO., LTD., Kiryu (JP)

(72) Inventor: Yoshinori Shiroishi, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 60 days.

(21) Appl. No.: 16/520,816

(22) Filed: Jul. 24, 2019

(65) Prior Publication Data
US 2020/0070869 A1  Mar. 5, 2020

(30) Foreign Application Priority Data
Aug. 30, 2018  (JP) ............................. JP2018-161539

(51) Int. Cl.
*B62D 1/184* (2006.01)
*B62D 1/187* (2006.01)

(52) U.S. Cl.
CPC ............. *B62D 1/184* (2013.01); *B62D 1/187* (2013.01)

(58) Field of Classification Search
CPC .................................. B62D 1/184; B62D 1/187
See application file for complete search history.

(56) References Cited

U.S. PATENT DOCUMENTS

| | | | | |
|---|---|---|---|---|
| 5,503,431 A * | 4/1996 | Yamamoto | ............ | B62D 1/184 188/376 |
| 5,655,413 A * | 8/1997 | Barton | ................... | B62D 1/184 74/493 |
| 6,419,269 B1 * | 7/2002 | Manwaring | ............ | B62D 1/184 280/775 |
| 6,902,191 B2 * | 6/2005 | Angel | .................... | B62D 1/184 280/775 |
| 6,959,622 B2 * | 11/2005 | Masucci | ................ | B62D 1/184 74/493 |
| 8,931,364 B2 * | 1/2015 | Hirooka | ................. | B62D 1/184 74/493 |
| 8,960,721 B2 * | 2/2015 | Moriyama | ............. | B62D 1/187 280/777 |
| 9,039,042 B2 * | 5/2015 | Moriyama | ............. | B62D 1/184 280/775 |
| 9,120,503 B2 * | 9/2015 | Sugiura | ................... | B62D 1/184 |
| 9,604,663 B2 * | 3/2017 | Tomiyama | ............. | B62D 1/187 |
| 9,802,636 B2 * | 10/2017 | Geiselberger | .......... | B62D 1/184 |

(Continued)

FOREIGN PATENT DOCUMENTS

| JP | 09290759 A | * 11/1997 | ............. B62D 1/197 |
|---|---|---|---|
| JP | 2008-018803 | 1/2008 | |

(Continued)

*Primary Examiner* — Laura Freedman
(74) *Attorney, Agent, or Firm* — Rankin, Hill & Clark LLP (57) ABSTRACT

A steering device includes a column unit, a front bracket, a rear bracket, and a lock mechanism. A tilt guide part through which a lock bolt is inserted and which guides vertical movement of the lock bolt in accordance with rotation of the column unit is formed on the rear bracket. The tilt guide part includes an intermediate guide part, and an upper guide part continuous with an upper side of the intermediate guide part and having a smaller width than that of the intermediate guide part. The upper guide part is configured so that the lock bolt is slidable in accordance with the rotation of the column unit and is configured to be elastically deformable.

7 Claims, 10 Drawing Sheets

(56) References Cited

U.S. PATENT DOCUMENTS

10,286,944 B2 * 5/2019 Fujimura ............... B62D 1/184
2007/0068311 A1 * 3/2007 Shimoda ................ B62D 1/184
74/493

FOREIGN PATENT DOCUMENTS

JP        2019182298 A  * 10/2019
WO    WO-2008011945 A1 *  1/2008 ............. B62D 1/184

* cited by examiner

STEERING DEVICE

CROSS-REFERENCE TO RELATED APPLICATION

Priority is claimed on Japanese Patent Application No. 2018-161539, filed Aug. 30, 2018, the content of which is incorporated herein by reference.

BACKGROUND OF THE INVENTION

Field of the Invention

The present invention relates to a steering device.

Description of Related Art

Some steering devices have a tilt function. A tilt function is a function of adjusting a tilt angle of a steering wheel (steering shaft) in accordance with physique differences and driving postures of drivers. Such a steering device includes a column which supports a steering shaft to be rotatable, and a front bracket and a rear bracket attached to a vehicle body and configured to support the column (see, for example, Japanese Unexamined Patent Application, First Publication No. 2008-18803).

The front bracket rotatably supports the column via a pivot shaft.

A tilt guide hole extending in a vertical direction is formed in the rear bracket. The rear bracket and the column are connected by a lock bolt inserted into the tilt guide hole.

According to this configuration, the lock bolt vertically moves in the tilt guide hole in accordance with rotation of the column around the pivot shaft. Thereby, a tilt angle of the column (steering shaft) is changed. Further, after adjusting the tilt, the rotation of the column is restricted by a lock mechanism.

SUMMARY OF INVENTION

However, in the conventional technology described above, after a column is rotated to a desired tilt angle and before rotation of the column is restricted by a lock mechanism, there is a possibility of downward positional deviation in the column and a steering shaft due to the weight of the column and the steering shaft. Therefore, in the conventional steering device, there is still room for improvement in holding the steering shaft at a desired tilt angle.

An aspect according to the present invention has been made in consideration of such circumstances, and an objective of the present invention is to provide a steering device capable of holding a steering shaft at a desired tilt angle.

In order to solve the above-described problem, the present invention employs the following aspects.

(1) A steering device according to an aspect of the present invention includes a column configured to support a steering shaft to be rotatable around a first axis extending in a front-rear direction, a front bracket attached to a vehicle body and configured to support the column to be rotatable around a second axis extending in a lateral direction, a rear bracket attached to the vehicle body at a rear of the front bracket and including rear side walls sandwiching the column from both sides in the lateral direction, and a lock mechanism including a shaft member which connects the rear side walls and the column and configured to restrict and allow a rotation of the column around the second axis, in which a tilt guide part through which the shaft member is inserted and which guides vertical movement of the shaft member in accordance with the rotation of the column is formed on each of the rear side walls, the tilt guide part includes a first guide part, and a second guide part continuous with an upper side of the first guide part and having a smaller width in the front-rear direction than the first guide part, and the second guide part is configured so that the shaft member is slidable in accordance with the rotation of the column and is configured to be elastically deformable.

In the above aspect (1), the column can be rotated around the second axis by allowing the column to rotate by the lock mechanism at the time of the tilt operation. After the column is rotated to a desired tilt angle and when the rotation of the column is restricted by the lock mechanism the column can be held at the desired tilt angle.

Here, when the column (steering shaft) is moved to, for example, an uppermost end position, the shaft member passes through the first guide part and enters the second guide part in the process of rotating the column upward.

In the above-described aspect (1), a width of the second guide part in the front-rear direction is smaller than that of the first guide part. Therefore, sliding resistance generated between the shaft member and the second guide part is greater than sliding resistance generated between the shaft member and the first guide part. Therefore, it is possible to suppress downward positional deviation of the column due to an influence of the weight of the column or the like before the rotation of the column is restricted by the lock mechanism.

Moreover, in the above-described aspect (1), the second guide part is configured to be elastically deformable. Therefore, it is possible to suppress the sliding resistance generated between the shaft member and the second guide part from becoming excessive due to dimensional variation or the like compared to, for example, a configuration in which the second guide part is plastically deformed.

(2) In the above-described aspect (1), a biasing member interposed between the shaft member and the rear bracket and configured to bias the column upward may be provided.

In the above-described aspect (2), a biasing force of the biasing member acts in a direction in which it resists the weight of the column. Thereby, falling of the column downward can be suppressed, and tilt balance can be achieved.

(3) In the above-described aspect (1) or (2), a width of the second guide part may be smaller than a diameter of the shaft member.

In the above-described aspect (3), when the shaft member moves in the second guide part, the second guide part is elastically deformed to be pushed and extended due to the shaft member. Thereby, the sliding resistance between the shaft member and the second guide part can be secured.

(4) In any one of the above-described aspects (1) to (3), a width of the first guide part may be greater than the diameter of the shaft member.

In the above-described aspect (4), the sliding resistance between the shaft member and the first guide part when the shaft member moves in the first guide part can be reduced. Thereby, operativity when the shaft member moves in the first guide part can be improved.

(5) In any one of the above-described aspects (1) to (4), the tilt guide part may include a third guide part continuous with a lower side of the first guide part and having a smaller width in the front-rear direction than the first guide part, and the third guide part may be configured so that the shaft member is slidable in accordance with the rotation of the column and may be configured to be elastically deformable.

In the above-described aspect (5), the sliding resistance generated between the shaft member and the third guide part is greater than the sliding resistance generated between the shaft member and the first guide part. Accordingly, it is possible to suppress upward positional deviation of the column due to a restoring force of the biasing member or the like before the rotation of the column is restricted by the lock mechanism.

Moreover, in the above-described aspect (5), the third guide part is configured to be elastically deformable. Therefore, it is possible to suppress the sliding resistance generated between the shaft member and the third guide part from becoming excessive due to dimensional variation or the like compared to, for example, a configuration in which the third guide part is plastically deformed.

(6) In the above-described aspect (5), a width of the third guide part may be smaller than the diameter of the shaft member.

In the above-described aspect (6), when the shaft member moves in the third guide part, the third guide part is elastically deformed to be pushed and extended due to the shaft member. Thereby, the sliding resistance between the shaft member and the third guide part can be secured.

(7) In any one of the above-described aspects (1) to (6), the tilt guide part may be formed by fitting an elastic ring into a tilt guide hole which penetrates in the lateral direction of the rear side wall, and the shaft member may be inserted into the elastic ring.

In the above-described aspect (7), the above-described operation and effects are achieved simply by fitting the elastic ring into the tilt guide hole. Thereby, the column can be held at a desired tilt angle without involving significant design changes.

According to the aspects of the present invention, the steering shaft can be held at a desired tilt angle.

DETAILED DESCRIPTION OF THE INVENTION

Next, an embodiment of the present invention will be described on the basis of the drawings.

[Steering Device]

Figure 1:
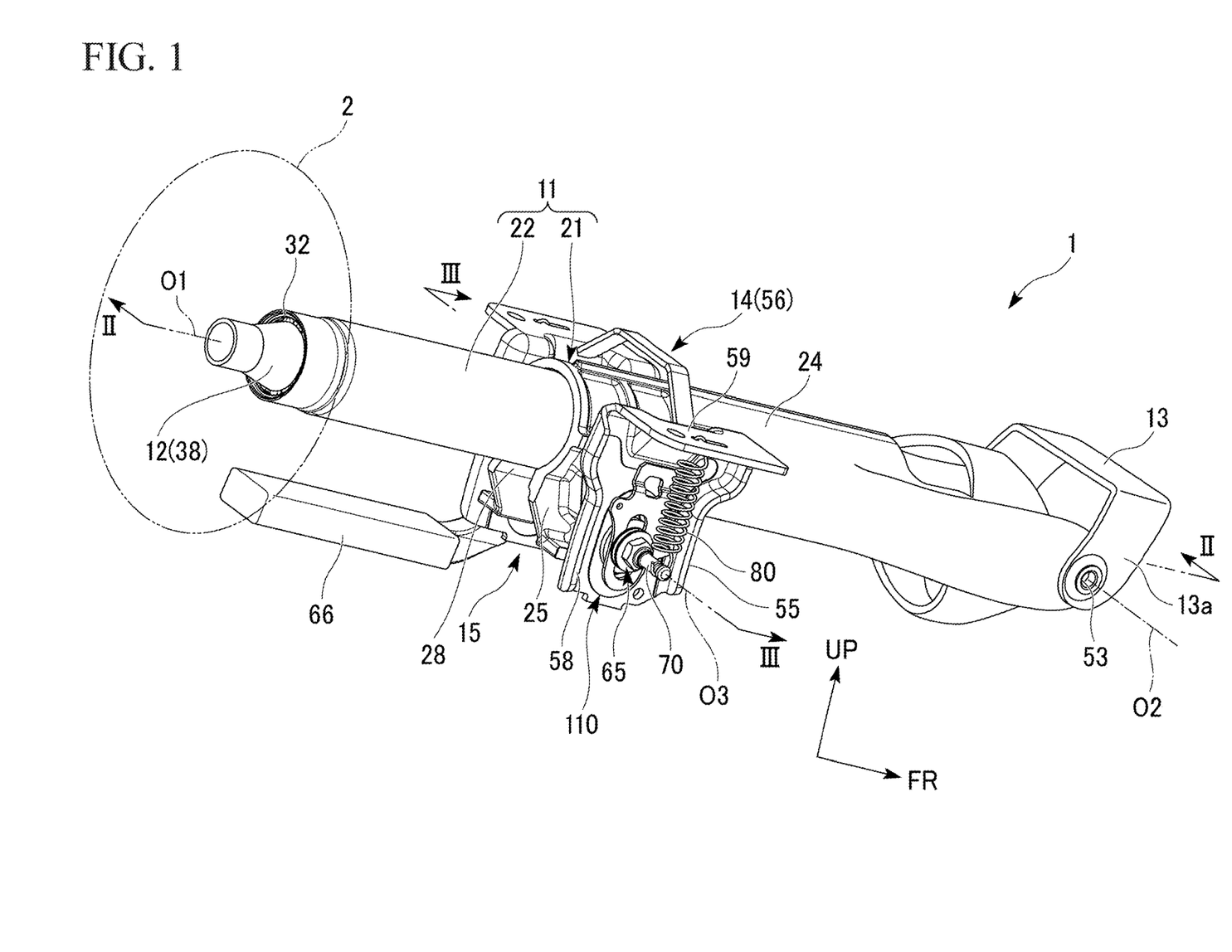
FIG. 1 is a perspective view of a steering device according to an embodiment.

FIG. 1 is a perspective view of a steering device 1.

As illustrated in FIG. 1, the steering device 1 is mounted in a vehicle. The steering device 1 adjusts a steering angle of wheels in accordance with an operation of rotating a steering wheel 2.

The steering device 1 includes a column unit (column) 11, a steering shaft 12, a fixed bracket (a front bracket 13 and a rear bracket 14), and a switching unit 15. The column unit 11 and the steering shaft 12 are each formed along an axis O1. Therefore, in the following description, a direction in which the axis O1 of the column unit 11 and the steering shaft 12 extends is simply referred to as a shaft axial direction, a direction perpendicular to the axis O1 is referred to as a shaft radial direction, and a direction around the axis O1 is referred to as a shaft circumferential direction in some cases.

The steering device 1 of the present embodiment is mounted in a vehicle in a state in which the axis O1 intersects a front-rear direction. Specifically, the axis O1 of the steering device 1 extends upward as it goes rearward. However, in the following description, for the sake of convenience, in the steering device 1, a direction toward the steering wheel 2 in the shaft axial direction is simply referred to as a rear side, and a direction toward a side opposite to the steering wheel 2 is simply referred to as a front side (the arrow FR). Also, in the shaft radial direction, a vertical direction in a state in which the steering device 1 is attached to the vehicle is simply referred to as a vertical direction (the arrow UP points upward), and a lateral direction is simply referred to as a lateral direction.

<Column Unit>

The column unit 11 includes an outer column 21 and an inner column 22.

The outer column 21 is attached to a vehicle body via the fixed brackets 13 and 14.

The outer column 21 mainly includes a holding cylindrical part 24 and fastening parts 25.

Figure 2:
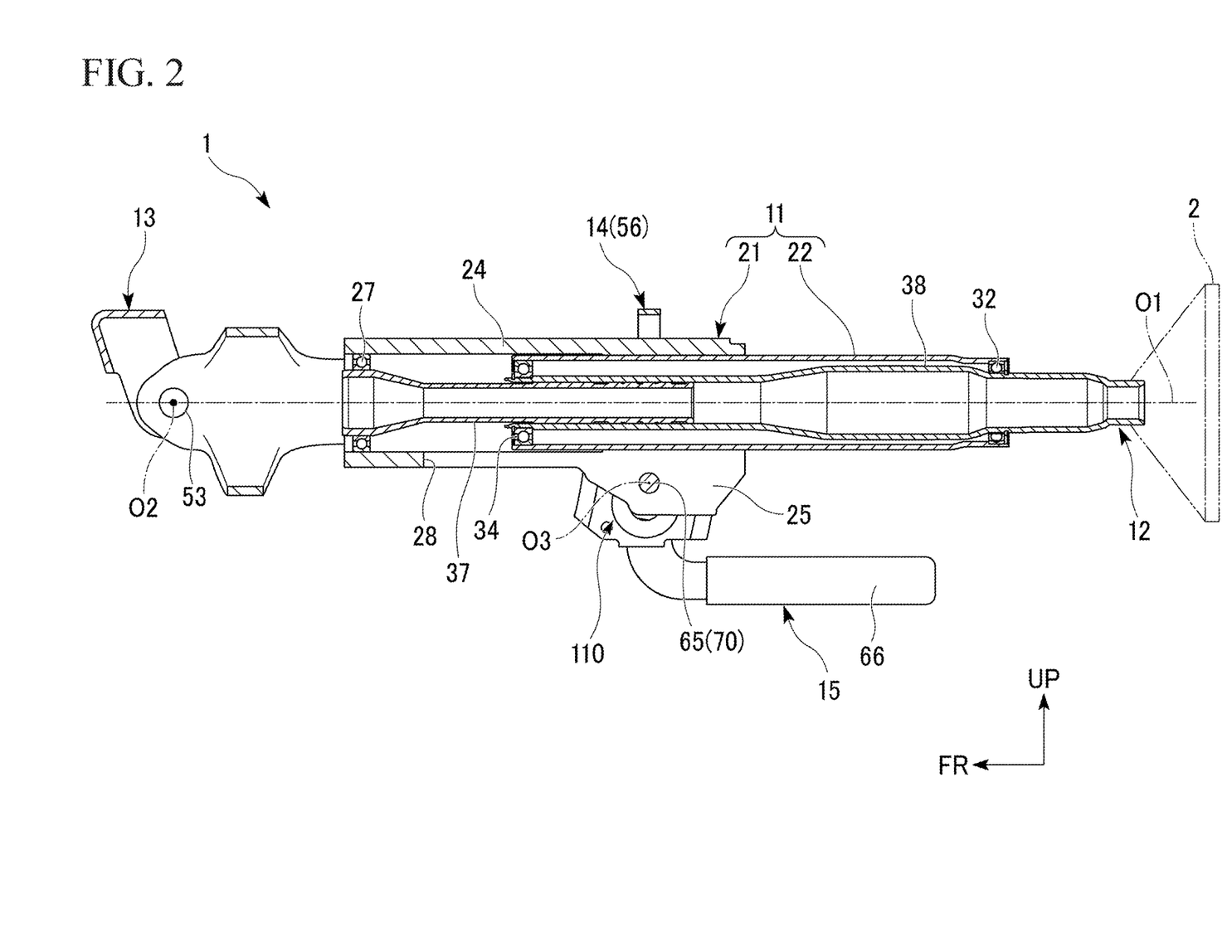
FIG. 2 is a cross-sectional view taken along line II-II of FIG. 1.

FIG. 2 is a cross-sectional view taken along line II-II of FIG. 1.

As illustrated in FIG. 2, the holding cylindrical part 24 is formed in a cylindrical shape extending along the axis O1.

An outer ring of a front bearing 27 is fitted (press-fitted) to a front end portion in the holding cylindrical part 24. A slit 28 is formed in a portion in the shaft circumferential direction (in the present embodiment, a lower portion of the outer column 21) of the holding cylindrical part 24. The slit 28 penetrates the outer column 21 in the shaft radial direction and is open at a rear end surface of the outer column 21.

Figure 3:
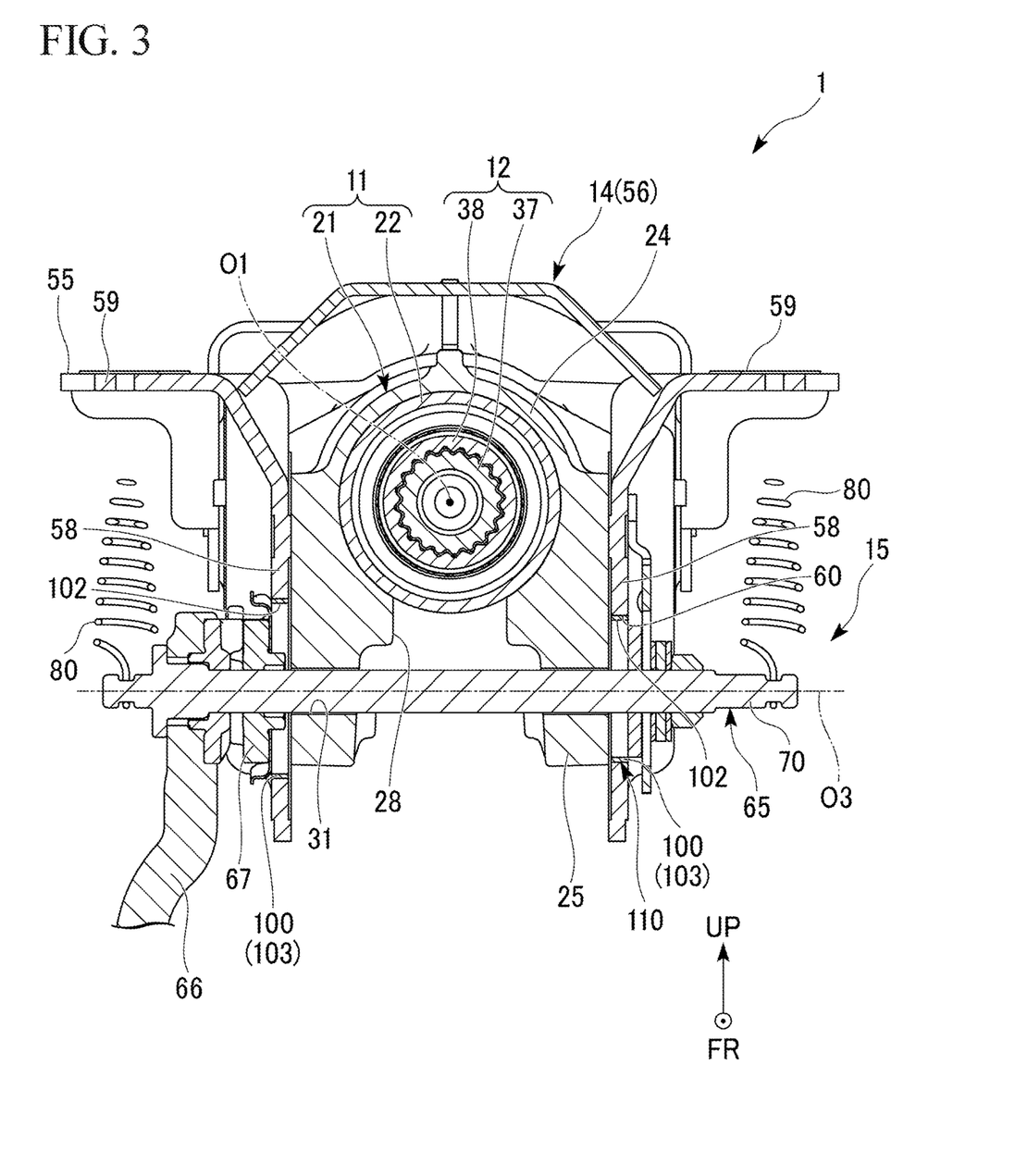
FIG. 3 is a cross-sectional view taken along line of FIG. 1.

FIG. 3 is a cross-sectional view taken along line of FIG. 1.

As illustrated in FIG. 3, the fastening parts 25 extend downward from positions of the holding cylindrical part 24 facing each other in the lateral direction with the slit 28 interposed therebetween. A through hole 31 penetrating the fastening part 25 in the lateral direction is formed in each of the fastening parts 25.

As illustrated in FIG. 2, the inner column 22 is formed in a cylindrical shape extending along the axis O1. An outer diameter of the inner column 22 is smaller than an inner diameter of the holding cylindrical part 24. The inner column 22 is inserted into the holding cylindrical part 24. The inner column 22 is configured to be movable in the shaft axial direction with respect to the holding cylindrical part 24. An outer ring of a rear bearing 32 is fitted (press-fitted) to a rear end portion in the inner column 22. An outer ring of an intermediate bearing 34 is fitted (press-fitted) to a front end portion in the inner column 22.

<Steering Shaft>

The steering shaft 12 includes an inner shaft 37 and an outer shaft 38.

The inner shaft 37 is formed in a hollow cylindrical shape extending along the axis O1. The inner shaft 37 is inserted into the holding cylindrical part 24 with a gap formed therebetween. A front end portion of the inner shaft 37 is press-fitted into an inner ring of the front bearing 27 described above. Thus, the inner shaft 37 is rotatably supported around the axis O1 in the holding cylindrical part 24 via the front bearing 27. The front end portion of the inner shaft 37 (a portion protruding forward from the front bearing 27) is connected to, for example, a lower shaft (not illustrated), a steering gear box (not illustrated), or the like via a universal joint (not illustrated) or the like.

The outer shaft 38 extends in the shaft axial direction. The outer shaft 38 is configured to be movable in the shaft axial direction with respect to the inner shaft 37 in accordance with movement of the inner column 22 in the shaft axial direction with respect to the outer column 21. Further, for example, a female spline is formed on an inner circumferential surface of the outer shaft 38. The female spline is engaged with a male spline formed on an outer circumferential surface of the inner shaft 37. Thereby, the outer shaft 38 moves in the shaft axial direction with respect to the inner shaft 37 while relative rotation thereof with respect to the inner shaft 37 is restricted. However, the telescopic structure and rotation restriction of the steering shaft 12 can be changed as appropriate.

A rear end portion of the outer shaft 38 is press-fitted into an inner ring of the rear bearing 32 in the inner column 22. A front end portion of the outer shaft 38 is press-fitted into an inner ring of the intermediate bearing 34 in the inner column 22. Thereby, the outer shaft 38 is configured to be rotatable around the axis O1 with respect to the inner column 22. The steering wheel 2 is connected to a portion of the outer shaft 38 protruding toward the rear of the inner column 22. Although a configuration in which the outer shaft 38 is disposed on the rear side of the inner shaft 37 has been described in the present embodiment, the present invention is not limited only to this configuration, and the outer shaft 38 may be configured to be disposed on a front side of the inner shaft 37.

<Front Bracket>

As illustrated in FIG. 1, the front bracket 13 described above connects the outer column 21 and the vehicle body via a pivot shaft 53. The front bracket 13 is formed in a U shape that opens downward in a front view when viewed from the shaft axial direction. The front bracket 13 surrounds a rear end portion of the outer column 21 from above and from both sides in the lateral direction. Front side walls 13a positioned on both sides in the lateral direction of the front bracket 13 are connected to the outer column 21 by the pivot shaft 53. Thereby, the outer column 21 is supported by the front bracket 13 to be rotatable around an axis O2 in the lateral direction of the pivot shaft 53.

<Rear Bracket>

As illustrated in FIG. 3, the rear bracket 14 connects the outer column 21 and the vehicle body via a lock bolt 70 to be described below. The rear bracket 14 is formed in a U shape that opens downward in a front view when viewed from the shaft axial direction. The rear bracket 14 surrounds an upper side and both lateral sides of the outer column 21.

Specifically, the rear bracket 14 includes side plate parts 55 disposed on both lateral sides of the column unit 11, and a bridge part 56 connecting the side plate parts 55 to each other.

The side plate parts 55 are each formed in an L shape in a front view when viewed from the shaft axial direction. Each of the side plate parts 55 includes a rear side wall 58 extending in the vertical direction, and an overhanging part 59 that protrudes outward in the lateral direction from an upper end portion of the rear side wall 58.

A tilt guide hole 60 penetrating the rear side wall 58 in the lateral direction is formed in the rear side wall 58. The tilt guide hole 60 is a long hole extending toward the rear side as it goes upward. Specifically, the tilt guide hole 60 is formed in an arcuate shape that is convex toward the rear.

The overhanging part 59 is connected to the vehicle body.

The bridge part 56 is connected to the upper end portion of each rear side wall 58. The bridge part 56 is formed in an arch shape protruding upward. The bridge part 56 restricts a rise of the column unit 11 in a tilt operation of the column unit 11 (angle adjustment of the column unit 11 around the axis O2).

<Switching Unit>

The switching unit 15 mainly includes a lock mechanism 65 having the lock bolt (shaft member) 70, an operation lever 66, and a fastening cam 67.

As illustrated in FIG. 3, the lock bolt 70 is formed with a smaller diameter than the through hole 31 formed in each of the fastening parts 25. The lock bolt 70 passes through the fastening parts 25 and the rear bracket 14 in the lateral direction through the through holes 31 of the fastening parts 25 and the tilt guide hole 60 of the rear bracket 14 described above. A diameter of the lock bolt 70 is smaller than a width of the tilt guide hole 60 in the shaft axial direction. In the following description, a direction in which an axis O3 of the lock bolt 70 extends is simply referred to as a bolt axial direction (lateral direction), a direction perpendicular to the axis O3 is referred to as a bolt radial direction, and a direction around the axis O3 is referred to as a bolt circumferential direction in some cases.

As illustrated in FIG. 1, the operation lever 66 is connected to a first end portion (left end portion in the illustrated example) of the lock bolt 70 in the lateral direction. The operation lever 66 is configured to be rotatable around the axis O3 together with the lock mechanism 65.

As illustrated in FIG. 3, the fastening cam 67 is interposed between the operation lever 66 and the rear side wall 58 of the rear bracket 14. The fastening cam 67 is configured such that a thickness in the lateral direction changes in accordance with a rotational operation of the operation lever 66. In the steering device 1, when the thickness of the fastening cam 67 changes, the fastening parts 25 are configured to move toward and away from each other in the lateral direction via the respective rear side walls 58 (such that a width (distance) of the slit 28 in the lateral direction expands and contracts). Specifically, when the operation lever 66 is rotationally operated to increase the thickness of the fastening cam 67, the fastening parts 25 come toward each other together with the rear side walls 58 to decrease the diameter of the holding cylindrical part 24.

Thus, the outer column 21 is sandwiched by the rear side walls 58, and the inner column 22 is sandwiched by the holding cylindrical part 24 of the outer column 21. As a result, movement of the inner column 22 in the shaft axial direction with respect to the outer column 21 is restricted, and rotation of the column unit 11 around the pivot shaft 53 is restricted (locked state).

On the other hand, when the operation lever 66 is rotationally operated to decrease the thickness of the fastening cam 67 in the locked state, the fastening parts 25 are separated from each other together with the rear side walls 58 to increase the diameter of the holding cylindrical part 24. Accordingly, the sandwiched state of the outer column 21 by the rear side wall 58 is released, and the sandwiched state of the inner column 22 by the holding cylindrical part 24 of the outer column 21 is released. As a result, movement of the inner column 22 in the shaft axial direction with respect to the outer column 21 is allowed, and rotation of the column unit 11 around the pivot shaft 53 is allowed (unlocked state).

Biasing members 80 are interposed between both end portions in the lateral direction of the lock bolt 70 described above and the above-described overhanging parts 59 of the rear bracket 14. The biasing members 80 are for achieving tilt balance. The biasing members 80 are, for example, coil springs. Upper end portions of the biasing members 80 are connected to the overhanging parts 59, and lower end portions thereof are connected to the lock bolt 70. Further, the steering device 1 may be configured not to have the biasing members 80.

The biasing members 80 bias the column unit 11, the steering shaft 12, and the like upward via the lock bolt 70. Thereby, the column unit 11 is prevented from being lowered to its lowermost end position by its own weight when the lock is released.

Figure 4:
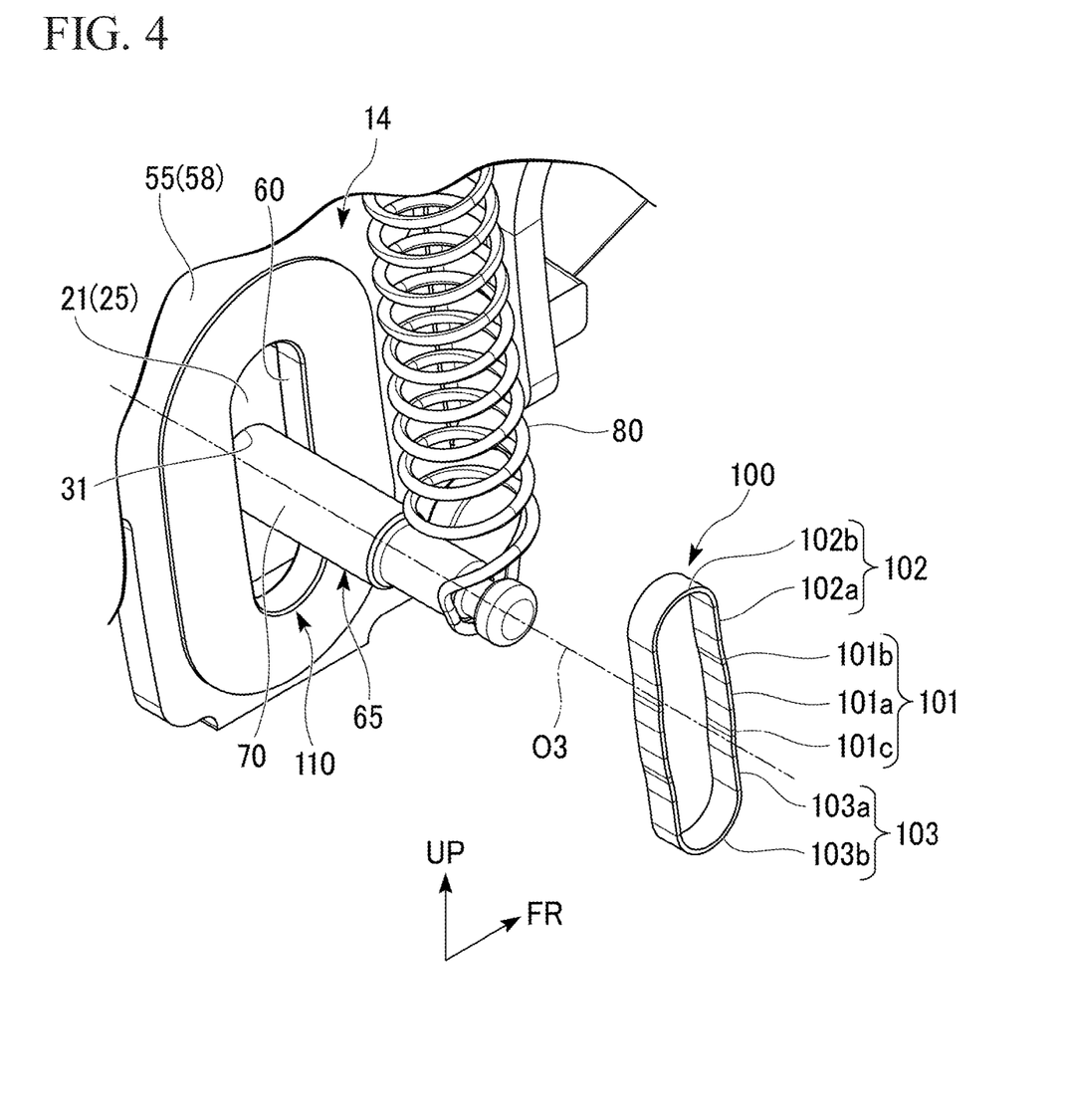
FIG. 4 is an exploded perspective view illustrating surroundings of a rear bracket according to the embodiment.
Figure 5:
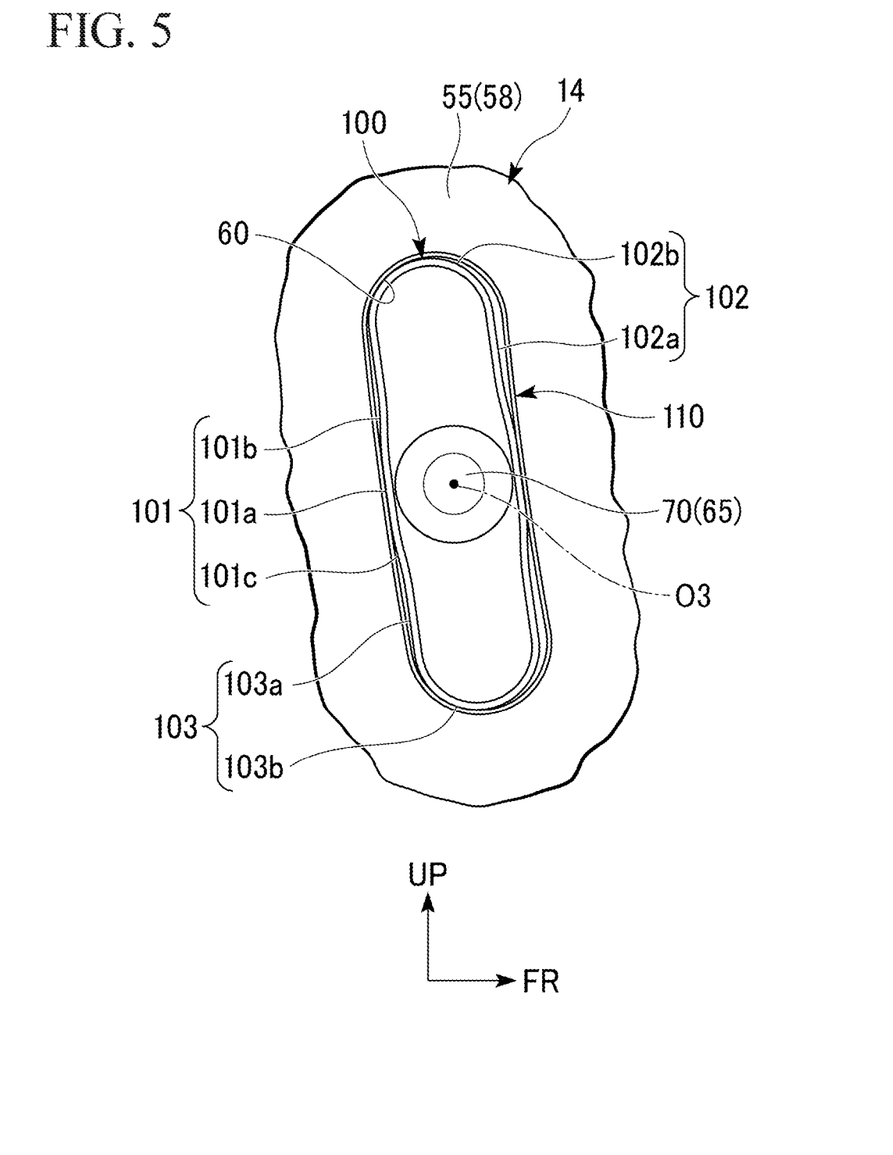
FIG. 5 is an enlarged side view illustrating surroundings of a rear side wall according to the embodiment.

FIG. 4 is an exploded perspective view illustrating surroundings of the rear bracket 14. FIG. 5 is an enlarged side view illustrating surroundings of the rear side wall 58.

Figure 6:
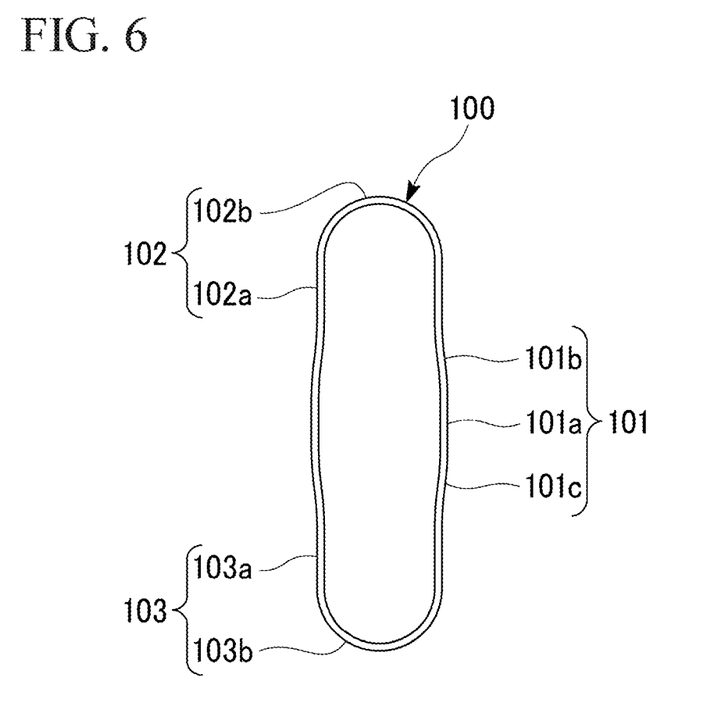
FIG. 6 is a side view of an elastic ring according to the embodiment.

As illustrated in FIGS. 4 and 5, an elastic ring 100 is fitted into the tilt guide hole 60 described above. The elastic ring 100 is formed by shaping a strip-shaped plate illustrated in FIG. 6 into an oval shape. The elastic ring 100 is held in the tilt guide hole 60 by being sandwiched in the lateral direction by, for example, the outer column 21 and the fastening cam 67. In the present embodiment, the rear side wall 58 in which the tilt guide hole 60 is formed and the elastic ring 100 constitute a tilt guide part 110 according to the present invention. The elastic ring 100 may be fitted to follow a shape of the tilt guide hole 60 in a state in which it is curved in an arcuate shape that is convex toward the rear or may be shaped to follow the shape of the tilt guide hole 60.

As illustrated in FIG. 5, a width of the elastic ring 100 in the shaft axial direction (front-rear direction) differs depending on a position in the vertical direction. Specifically, an intermediate guide part (first guide part) 101, an upper guide part (second guide part) 102, and a lower guide part (third guide part) 103 are integrally continuous in the elastic ring 100.

The intermediate guide part 101 is positioned at an intermediate portion in the vertical direction in the tilt guide hole 60. The intermediate guide part 101 includes a wide portion 101*a*, an upper connection portion 101*b*, and a lower connection portion 101*c*.

In the wide portion 101*a*, a width in a minor axis direction (width in the shaft axial direction) of the elastic ring 100 is greater than the diameter of the lock bolt 70. An outer circumferential surface of the wide portion 101*a* is in contact with an inner circumferential surface of the tilt guide hole 60. A width of the wide portion 101*a* is uniformly formed throughout the vertical direction. However, the width of the wide portion 101*a* may be changed according to a position in the vertical direction.

The upper connection portion 101*b* is formed in a tapered shape in which a width thereof gradually decreases upward from an upper end edge of the wide portion 101*a*. However, the upper connection portion 101*b* may be formed so that the wide portion 101*a* and the upper guide part 102 are connected in a stepped manner.

The lower connection portion 101*c* is formed in a tapered shape in which a width thereof gradually decreases downward from a lower end edge of the wide portion 101*a*. However, the lower connection portion 101*c* may be formed so that the wide portion 101*a* and the lower guide part 103 are connected in a stepped manner.

The upper guide part 102 is smoothly continuous with an upper end edge of the intermediate guide part 101 via the upper connection portion 101*b*. The upper guide part 102 is positioned at an upper portion in the tilt guide hole 60. The upper guide part 102 includes an upper sliding portion 102*a* and an upper end portion 102*b*.

A width of the upper sliding portion 102*a* is smaller than the diameter of the lock bolt 70. Therefore, a gap is provided in a width in the shaft axial direction between an outer circumferential surface of the upper sliding portion 102*a* and the inner circumferential surface of the tilt guide hole 60. The upper sliding portion 102*a* is configured to be elastically deformable so that it is pushed and extended outward in the shaft axial direction as the lock bolt 70 enters. In the illustrated example, the width of the upper sliding portion 102*a* is uniformly formed throughout the vertical direction. However, the width of the upper sliding portion 102*a* may be changed according to a position in the vertical direction. For example, the upper sliding portion 102*a* may be formed in a tapered shape in which it gradually narrows upward.

The upper end portion 102*b* is continuous with an upper end edge of the upper sliding portion 102*a*. The upper end portion 102*b* is formed in an arcuate shape that is convex upward. That is, the upper end portion 102*b* is formed such that a width thereof gradually decreases upward. An outer circumferential surface of the upper end portion 102*b* is close to or in contact with the inner circumferential surface of the tilt guide hole 60.

The lower guide part 103 is smoothly continuous with a lower end edge of the intermediate guide part 101 via the lower connection portion 101*c*. The lower guide part 103 is positioned at a lower portion in the tilt guide hole 60. The lower guide part 103 includes a lower sliding portion 103*a* and a lower end portion 103*b*.

A width of the lower sliding portion 103*a* is smaller than the diameter of the lock bolt 70. A gap is provided in a width in the shaft axial direction between an outer circumferential surface of the lower sliding portion 103*a* and the inner circumferential surface of the tilt guide hole 60. In the present embodiment, the width of the lower sliding portion 103*a* is the same as the width of the upper sliding portion 102*a*. However, the width of the lower sliding portion 103*a* and the width of the upper sliding portion 102*a* may be different from each other. In this case, the width of the lower sliding portion 103*a* is preferably greater than the width of the upper sliding portion 102*a*.

The lower sliding portion 103*a* is configured to be elastically deformable so that it is pushed and extended outward in the shaft axial direction as the lock bolt 70 enters. In the illustrated example, the width of the lower sliding portion 103*a* is uniformly formed throughout the vertical direction. However, the width of the lower sliding portion 103*a* may be changed according to a position in the vertical direction. For example, the lower sliding portion 103*a* may be formed in a tapered shape in which it gradually narrows downward.

The lower end portion 103*b* is continuous with a lower end edge of the sliding portion 103*a*. The lower end portion 103*b* is formed in an arcuate shape that is convex downward.

That is, the lower end portion 103b is formed such that a width thereof gradually decreases downward. An outer circumferential surface of the lower end portion 103b is close to or in contact with the inner circumferential surface of the tilt guide hole 60.

In the present embodiment, lengths of the intermediate guide part 101, the upper guide part 102, and the lower guide part 103 in the vertical direction are the same as one another. However, the lengths of the intermediate guide part 101, the upper guide part 102, and the lower guide part 103 in the vertical direction may be different from one another.

[Operation]

Next, an operation of the above-described steering device 1 will be described. In the following description, a tilt operation will be mainly described. In the following description, a state in which the lock bolt 70 is positioned at the intermediate portion of the tilt guide hole 60 in the vertical direction (a state in which it is positioned in the intermediate guide part 101) will be described as an initial state. In the steering device 1 of the present embodiment, when a hand is released from the steering wheel 2 in an unlocked state with the lock bolt 70 positioned in the intermediate guide part 101, a biasing force of the biasing member 80 is set so that the lock bolt 70 is positioned at the intermediate portion in the vertical direction in the tilt guide hole 60 (tilt guide part 110). That is, in the steering device 1, in the unlocked state, a resultant force of the lock bolt 70 due to the weight of the steering device 1 (column unit 11 and steering shaft 12), a frictional force between the pivot shaft 53 and the outer column 21, and a biasing force of the biasing member 80 is balanced at the intermediate portion in the vertical direction of the tilt guide hole 60.

Figure 7:
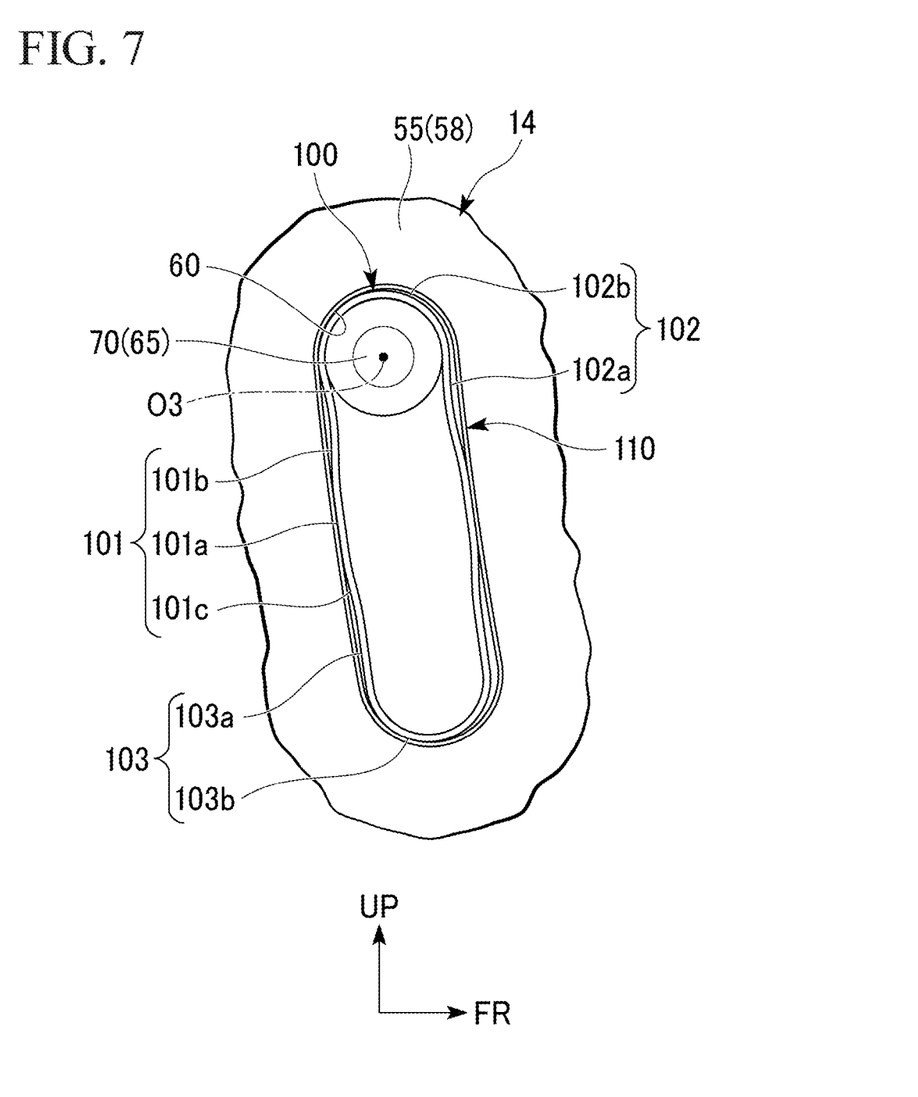
FIG. 7 is a cross-sectional view corresponding to FIG. 5, illustrating a state in which a column unit according to the embodiment is at an uppermost end position.

FIG. 7 is a cross-sectional view corresponding to FIG. 5, illustrating a state in which the column unit 11 is at an uppermost end position.

As illustrated in FIG. 7, in order to move the steering wheel 2 from the initial state to, for example, the uppermost end position, first, the operation lever 66 is rotationally operated to bring the steering device 1 into the unlocked state. Specifically, as illustrated in FIG. 3, the operation lever 66 is operated to rotate in a direction in which the thickness of the fastening cam 67 decreases (for example, downward). Then, the fastening parts 25 are separated from each other together with the respective rear side walls 58 so that the diameter of the holding cylindrical part 24 (slit 28) is enlarged. Thereby, the sandwiched state of the inner column 22 by the holding cylindrical part 24 is released, and the sandwiched state of the outer column 21 by the rear side walls 58 is released.

In the unlocked state, the steering wheel 2 is pushed upward. Then, the steering wheel 2 is rotated upward around the axis O2 along the tilt guide hole 60 together with the column unit 11 and the steering shaft 12. Specifically, the lock bolt 70 passes through the intermediate guide part 101 and enters the upper guide part 102. The lock bolt 70 which has entered the upper guide part 102 moves upward while pushing the upper sliding portion 102a to extend outward in the shaft axial direction. That is, sliding resistance generated between the lock bolt 70 and the upper sliding portion 102a is greater than sliding resistance generated between the lock bolt 70 and the intermediate guide part 101.

Further, in the process in which the column unit 11 is rotated upward, the lock bolt 70 moves upward in the elastic ring 100 (tilt guide hole 60). At this time, when the lock bolt 70 comes into contact with the upper end portion 102b, the upward rotation of the column unit 11 is restricted. Thereafter, the operation lever 66 is rotated to bring the steering device 1 into a locked state. Specifically, the operation lever 66 is rotationally operated in a direction in which the thickness of the fastening cam 67 increases (for example, upward). Then, the fastening parts 25 come toward each other together with the respective rear side walls 58 to decrease the diameter of the holding cylindrical part 24 (slit 28). Thereby, the inner column 22 is sandwiched by the holding cylindrical part 24, and the outer column 21 is sandwiched by the rear side walls 58. As a result, the tilt operation is restricted, and the steering wheel 2 can be fixed at the uppermost end position.

Figure 8:
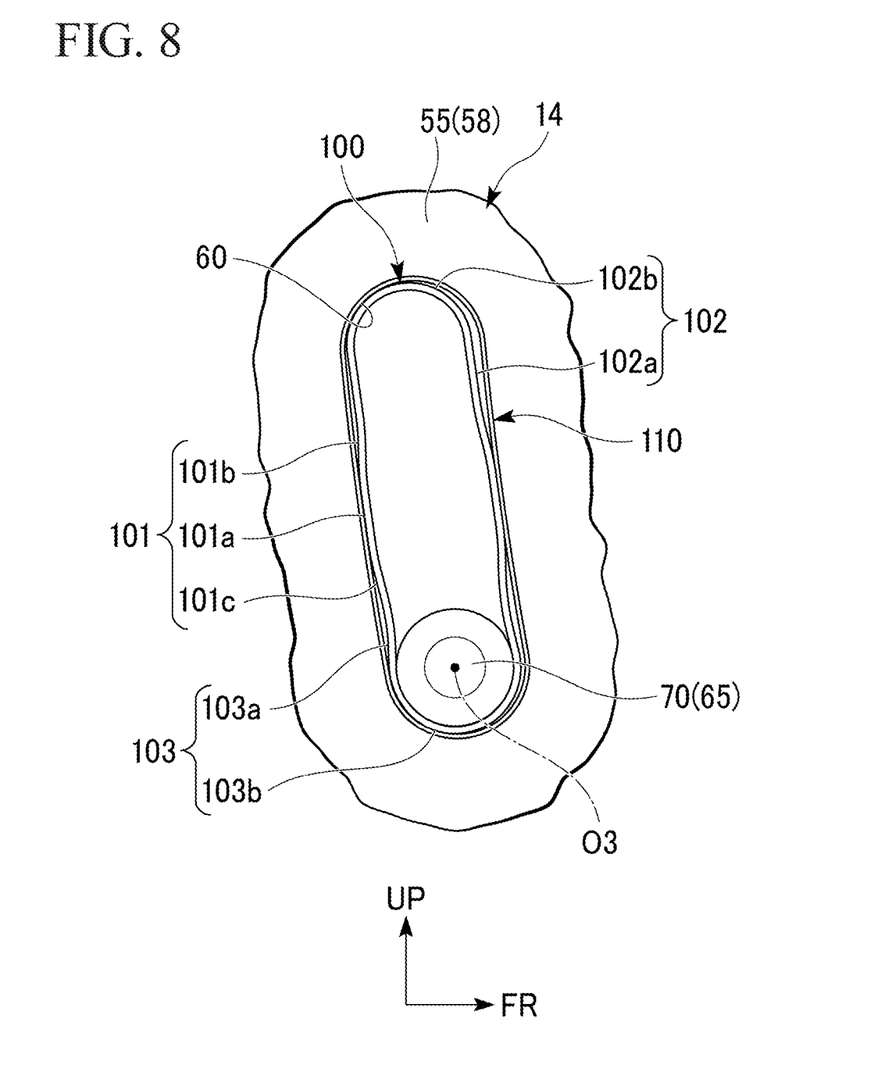
FIG. 8 is a cross-sectional view corresponding to FIG. 5, illustrating a state in which the column unit according to the embodiment is at a lowermost end position.

FIG. 8 is a cross-sectional view corresponding to FIG. 5, illustrating a state in which the column unit 11 is at the lowermost end position.

On the other hand, as illustrated in FIG. 8, in the unlocked state, in order to move the steering wheel 2 from the initial state to, for example, the lowermost end position, the steering wheel 2 is pulled downward. Then, the steering wheel 2 is rotated downward around the axis O2 along the tilt guide hole 60 together with the column unit 11 and the steering shaft 12. Specifically, the lock bolt 70 passes through the intermediate guide part 101 and enters the lower sliding portion 103a.

The lock bolt 70 which has entered the lower sliding portion 103a moves downward while pushing and extending the lower sliding portion 103a outward in the shaft axial direction. That is, sliding resistance generated between the lock bolt 70 and the lower sliding portion 103a is greater than the sliding resistance generated between the lock bolt 70 and the intermediate guide part 101. Thereafter, when the lock bolt 70 comes close to or in contact with the lower end portion 103b, the operation lever 66 is rotated to bring the steering device 1 into a locked state. As a result, the tilt operation is restricted, and the steering wheel 2 can be fixed at the lowermost position.

Thereby, an angle of the steering wheel 2 can be adjusted to an arbitrary position.

As described above, the present embodiment is configured such that a width of the upper guide part 102 is formed to be smaller than that of the intermediate guide part 101, and the lock bolt 70 is slidable in accordance with the rotation of the column unit 11.

According to this configuration, at the time of the tilt operation, when the rotation of the column unit 11 is allowed in the unlocked state, the column unit 11 can be rotated around the axis O2.

After the column unit 11 is rotated to a desired tilt angle and brought into the locked state, the column unit 11 can be held at the desired tilt angle.

Here, when the column unit 11 (steering shaft 12) is moved to, for example, the uppermost end position, the lock bolt 70 passes through the intermediate guide part 101 and enters the upper guide part 102 in the process of rotating the column unit 11 upward. At this time, the sliding resistance generated between the lock bolt 70 and the upper sliding portion 102a is greater than the sliding resistance generated between the lock bolt 70 and the intermediate guide part 101. Therefore, it is possible to suppress downward positional deviation of the column unit 11 due to an influence of the weight of the column unit 11 or the like before the locked state is established.

Moreover, in the present embodiment, the upper guide part 102 is configured to be elastically deformable. Therefore, it is possible to suppress the sliding resistance generated between the lock bolt 70 and the upper guide part 102 from becoming excessive due to dimensional variation or the like compared to, for example, a configuration in which the upper guide part 102 is plastically deformed.

In the present embodiment, the biasing member 80 for biasing the column unit 11 upward is configured to be interposed between the lock bolt 70 and the rear bracket 14.

According to this configuration, the biasing force of the biasing member 80 acts in a direction in which it resists the weight of the column unit 11. Thereby, falling of the column unit 11 downward can be suppressed, and the tilt balance can be achieved.

In the present embodiment, the width of the upper guide part 102 is configured to be smaller than the diameter of the lock bolt 70.

According to this configuration, when the lock bolt 70 moves in the upper guide part 102, the upper guide part 102 is elastically deformed to be pushed and extended due to the lock bolt 70. Thereby, the sliding resistance between the lock bolt 70 and the upper guide part 102 can be secured.

In the present embodiment, a width of the intermediate guide part 101 is configured to be greater than the diameter of the lock bolt 70.

According to this configuration, the sliding resistance between the lock bolt 70 and the intermediate guide part 101 when the lock bolt 70 moves in the intermediate guide part 101 can be reduced. Thereby, operability when the lock bolt 70 moves in the intermediate guide part 101 can be improved.

In the present embodiment, it is configured such that the lower guide part 103 which is continuous with a lower side of the intermediate guide part 101 and has a smaller width than that of the intermediate guide part 101 is provided.

According to this configuration, the sliding resistance generated between the lock bolt 70 and the lower guide part 103 is greater than the sliding resistance generated between the lock bolt 70 and the intermediate guide part 101. Accordingly, it is possible to suppress upward positional deviation of the column unit 11 due to a restoring force or the like of the biasing member 80 before the locked state is established.

In addition, in the present embodiment, the lower guide part 103 is configured to be elastically deformable. Therefore, it is possible to suppress the sliding resistance generated between the lock bolt 70 and the lower guide part 103 from becoming excessive due to dimensional variation or the like compared to, for example, a configuration in which the lower guide part 103 is plastically deformed.

In the present embodiment, the width of the lower guide part 103 is configured to be smaller than the diameter of the lock bolt 70.

According to this configuration, when the lock bolt 70 moves in the lower guide part 103, the lower guide part 103 is elastically deformed to be pushed and extended due to the lock bolt 70. Thereby, the sliding resistance between the lock bolt 70 and the lower guide part 103 can be secured.

In the present embodiment, the elastic ring 100 is fitted into the tilt guide hole 60 to form the tilt guide part 110.

According to this configuration, the above-described operation and effects are achieved simply by fitting the elastic ring 100 into the tilt guide hole 60. Thereby, the steering shaft 12 can be held at a desired tilt angle without involving significant design changes.

(Modified Example)

Further, in the embodiment described above, although a case in which the upper guide part 102 and the lower guide part 103 having a smaller width than that of the intermediate guide part 101 are formed on both upper and lower sides in the elastic ring 100 has been described, the present invention is not limited only to the configuration. The elastic ring 100 need only include the upper guide part 102 having a smaller width than that of the intermediate guide part 101 at least at the upper portion. Such a configuration will be described in the following modified example. In each modified example below, constituents corresponding to those in the above-described embodiment will be denoted by the same references as in the embodiment, and description thereof will be omitted.

Figure 9:
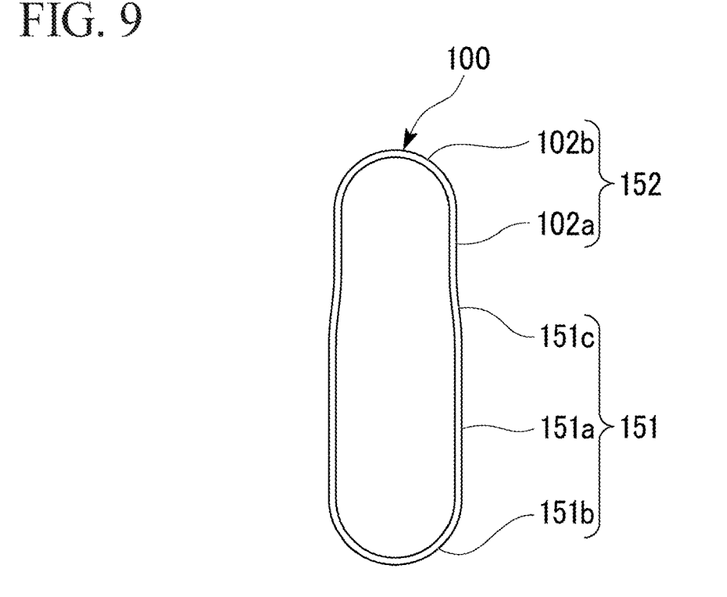
FIG. 9 is a side view of an elastic ring according to a first modified example.

FIG. 9 is a side view of an elastic ring 100 according to a first modified example.

The elastic ring 100 illustrated in FIG. 9 includes a first guide part 151 and a second guide part 152.

The first guide part 151 includes a wide portion 151a, a lower end portion 151b, and an upper connection portion 151c.

A width of the wide portion 151a is greater than the diameter of the lock bolt 70. An outer circumferential surface of the wide portion 151a is in contact with the inner circumferential surface of the tilt guide hole 60 (see FIG. 5). The width of the wide portion 151a is uniformly formed throughout the vertical direction. However, the width of the wide portion 151a may be changed according to a position in the vertical direction.

The lower end portion 151b is continuous with a lower end edge of the wide portion 151a. The lower end portion 151b is formed in an arcuate shape that is convex downward. An outer circumferential surface of the lower end portion 152b is close to or in contact with the inner circumferential surface of the tilt guide hole 60.

The upper connection portion 151c is formed in a tapered shape in which a width thereof gradually decreases upward from an upper end edge of the wide portion 151a.

The second guide part 152 is continuous with an upper end edge of the first guide part 151 via the upper connection portion 151c. The second guide part 152 includes an upper sliding portion 102a and an upper end portion 102b as in the above-described embodiment.

Also in the present modified example, the lock bolt 70 passes through the first guide part 151 and enters the second guide part 152 in the process of rotating the column unit 11 (steering shaft 12) upward. At this time, sliding resistance generated between the lock bolt 70 and the upper sliding portion 102a is greater than sliding resistance generated between the lock bolt 70 and the first guide part 151. Therefore, it is possible to suppress downward positional deviation of the column unit 11 due to an influence of the weight of the column unit 11 or the like before the locked state is established.

Figure 10:
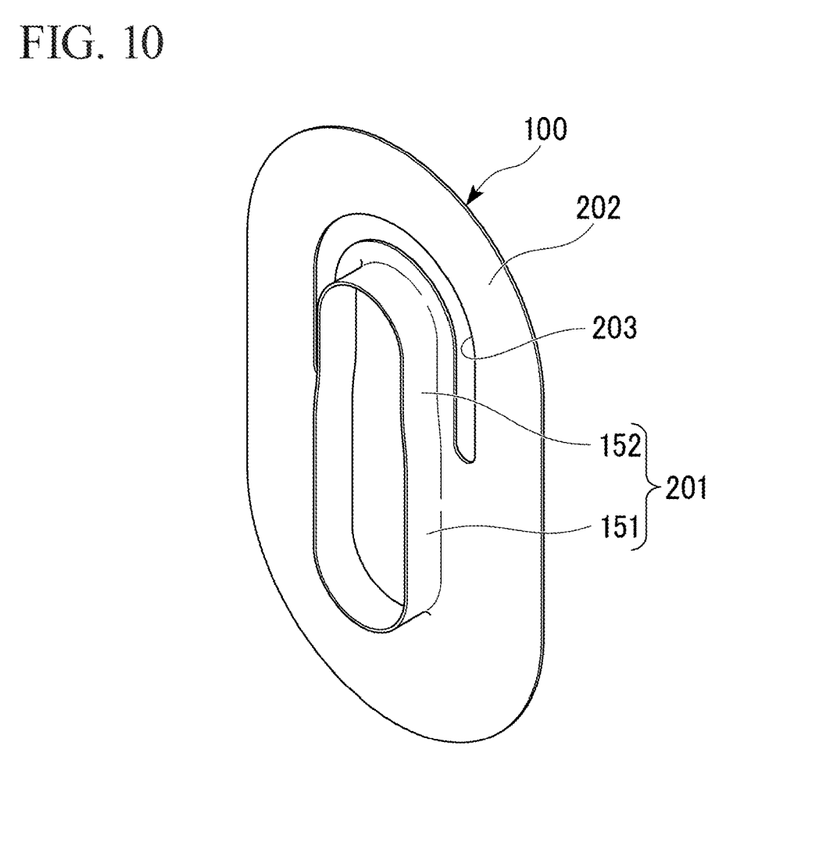
FIG. 10 is a perspective view of an elastic ring according to a second modified example.

FIG. 10 is a perspective view of an elastic ring 100 according to a second modified example. The present modified example differs from the above-described first modified example in that the elastic ring 100 includes a flange part 202.

The elastic ring 100 illustrated in FIG. 10 includes a ring part 201 and the flange part 202.

The ring part 201 is formed in an oval shape by the above-described guide parts 151 and 152.

The flange part 202 protrudes outward from an end portion in the lateral direction (opening direction) of the ring part 201. In the flange part 202, a relief hole 203 penetrating the flange part 202 is formed at a portion positioned around the second guide part 152. The relief hole 203 surrounds a periphery of the second guide part 152.

According to the present modified example, the flange part 202 is in contact, for example, with the rear side wall 58 in the lateral direction in a state in which the elastic ring 100 is fitted into the tilt guide hole 60 while achieving the same operation and effects as those of the first modified example described above. Thereby, positioning of the elastic ring 100 in the lateral direction in the tilt guide hole 60 is possible. As a result, assemblability can be improved. Further, whether or not the elastic ring 100 is fitted into the tilt guide hole 60 can be clearly ascertained by confirming presence or absence of the flange part 202. As a result, a failure to fit the elastic ring 100 at the manufacturing stage is easily prevented. Further, the flange part 202 of the present modified example can be employed also in the configuration of the above-described embodiment.

Figure 11:
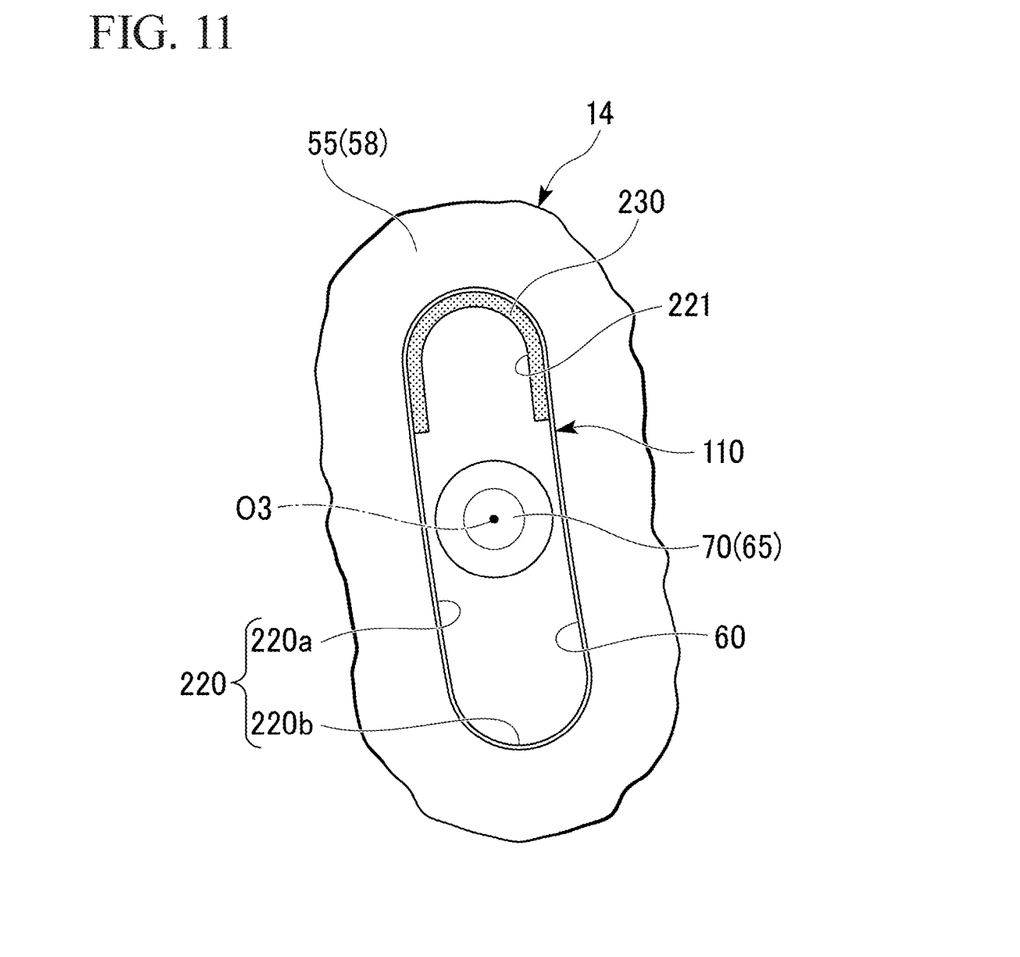
FIG. 11 is an enlarged side view illustrating surroundings of a rear side wall according to a third modified example.

FIG. 11 is an enlarged side view illustrating surroundings of the rear side wall 58 according to a third modified example. The present modified example differs from the embodiment described above in that an elastic member 230 is disposed only at an upper portion in the tilt guide hole 60.

The tilt guide part 110 illustrated in FIG. 11 includes a first guide part 220 and a second guide part 221.

The first guide part 220 is a region from a center portion to a lower end in the vertical direction of the tilt guide hole 60. That is, the first guide part 220 is defined by an inner circumferential surface of the tilt guide hole 60.

The first guide part 220 includes a wide portion 220a and a lower end portion 220b.

A width of the wide portion 220a is greater than the diameter of the lock bolt 70. The width of the wide portion 220a is uniformly formed throughout the vertical direction. However, the width of the wide portion 220a may be changed according to a position in the vertical direction.

The lower end portion 220b is continuous with a lower end edge of the wide portion 220a. The lower end portion 220b is formed in an arcuate shape that is convex downward. That is, the lower end portion 220b is formed such that a width thereof gradually decreases downward.

The second guide part 221 is continuous with an upper side of the first guide part 220. The second guide part 221 is constituted by disposing the elastic member 230 on an upper inner circumferential surface of the tilt guide hole 60.

The elastic member 230 is formed in a U-shape that opens downward. The elastic member 230 is disposed to follow the inner circumferential surface of the tilt guide hole 60 in the upper portion of the tilt guide hole 60. That is, an inner side of the elastic member 230 has a width smaller than that of the first guide part 220 (wide portion 220a) and constitutes the second guide part 221 on which the lock bolt 70 is slidable. In the present modified example, the inner width of the elastic member 230 is smaller than the diameter of the lock bolt 70.

According to the present modified example, the lock bolt 70 passes through the first guide part 220 and enters the second guide part 221 in the process of rotating the column unit 11 (steering shaft 12) upward. At this time, sliding resistance generated between the lock bolt 70 and the second guide part 221 is greater than sliding resistance generated between the lock bolt 70 and the first guide part 220. Therefore, it is possible to suppress downward positional deviation of the column unit 11 due to an influence of the weight of the column unit 11 or the like before the locked state is established. Further, in the present modified example, although a configuration in which the elastic member 230 is disposed only at the upper portion of the tilt guide hole 60 has been described, the elastic member 230 may be disposed at both the upper and lower portions of the tilt guide hole 60.

(Other Modified Examples)

While preferred embodiments of the present invention have been described above, it should be understood that these are exemplary of the present invention and are not to be considered as limiting. Additions, omissions, substitutions, and other changes to the configurations can be made without departing from the spirit or scope of the present invention. The present invention is not to be considered as being limited by the foregoing description and is only limited by the scope of the appended claims.

For example, in the embodiment described above, although a configuration in which the axis O1 intersects the shaft axial direction has been described, the present invention is not limited only to the configuration. The axis O1 may coincide with the shaft axial direction of the vehicle.

In the embodiment and the like described above, although a case in which separate elastic members (the elastic ring 100 and the elastic member 230) are disposed on the rear side wall 58 in which the tilt guide hole 60 is formed to form the tilt guide part 110 has been described, the present invention is not limited only to the configuration. For example, the rear side wall 58 itself may be formed of an elastically deformable material. In this case, the rear side wall 58 is the tilt guide part according to the present invention.

In the embodiment and the like described above, although a configuration in which the width of the upper guide part 102 (the upper sliding portion 102a) is smaller than the diameter of the lock bolt 70 has been described, the present invention is not limited only to the configuration. The width of the upper guide part 102 may be equal to or greater than the diameter of the lock bolt 70 as long as the lock bolt 70 is slidable.

In the embodiment and the like described above, although a configuration in which the width of the wide portion 101a of the intermediate guide part 101 is greater than the diameter of the lock bolt 70 has been described, the present invention is not limited only to the configuration. The width of the wide portion 101a may be equal to or less than the diameter of the lock bolt 70 as long as the width of the wide portion 101a is greater than the width of the upper sliding portion 102a.

In the embodiment and the like described above, although a case in which the lock bolt 70 is employed as the shaft member which connects the column unit 11 and the rear side wall 58 has been described, but the present invention is not limited only to the configuration. For example, the column unit 11 and the rear side wall 58 may be connected by, for example, a pin member or the like.

In the embodiment and the like described above, although a configuration in which the tilt guide part 110 penetrates the rear side wall 58 in the lateral direction has been described, the present invention is not limited only to the configuration. The tilt guide part may have any configuration as long as the connection member is accommodated therein.

In the embodiment and the like described above, although a configuration in which tilt balance is achieved at the intermediate portion of the tilt guide part 110 (tilt guide hole 60) in the vertical direction by the biasing member 80 has been described, the present invention is not limited only to the configuration. For example, a configuration may be such that the tilt balance is achieved at the upper portion or lower portion of the tilt guide part 110.

In the embodiment and the like described above, although a configuration in which the outer column 21 and the inner column 22 are provided for the column according to the present invention has been described, the present invention is not limited only to the configuration. The column need only be configured to rotatably support the steering shaft 12.

In the embodiment and the like described above, although a configuration in which the steering device 1 can perform only the tilt operation has been described, but the present invention is not limited only to the configuration. The steering device 1 may be capable of telescopic operation in which a front-rear position of the steering wheel 12 is adjusted by moving the outer column 21 and the inner column 22 relative to each other in the shaft axial direction.

In addition, the components in the above-described embodiments can be appropriately replaced with well-known components without departing from the spirit and scope of the present invention, and furthermore, the above-described modified examples may be appropriately combined.

What is claimed is:

1. A steering device comprising:
   a column configured to support a steering shaft to be rotatable around a first axis extending in a front-rear direction;
   a front bracket attached to a vehicle body and configured to support the column to be rotatable around a second axis extending in a lateral direction;
   a rear bracket attached to the vehicle body at a rear of the front bracket and including rear side walls sandwiching the column from both sides in the lateral direction; and
   a lock mechanism that includes a shaft member connecting the rear side walls and the column and is configured to restrict and allow a rotation of the column around the second axis, wherein
   a tilt guide part through which the shaft member is inserted and which guides vertical movement of the shaft member in accordance with the rotation of the column around the second axis is formed on each of the rear side walls,
   the tilt guide part includes:
   a first guide part; and
   a second guide part continuous with an upper side of the first guide part and having a smaller width in the front-rear direction than the first guide part, and
   the second guide part is configured to be elastically deformable so that the shaft member is movable to slide into the second guide part in accordance with the rotation of the column around the second axis.

2. The steering device according to claim 1, comprising a biasing member interposed between the shaft member and the rear bracket and configured to bias the column upward.

3. The steering device according to claim 1, wherein a width of the second guide part is smaller than a diameter of the shaft member.

4. The steering device according to claim 1, wherein a width of the first guide part is greater than a diameter of the shaft member.

5. The steering device according to claim 1, wherein
   the tilt guide part includes a third guide part continuous with a lower side of the first guide part and having a smaller width in the front-rear direction than the first guide part, and
   the third guide part is configured to be elastically deformable so that the shaft member is movable to slide into the third guide part in accordance with the rotation of the column around the second axis.

6. The steering device according to claim 5, wherein a width of the third guide part is smaller than a diameter of the shaft member.

7. The steering device according to claim 1, wherein
   the tilt guide part is formed by fitting an elastic ring into a tilt guide hole which penetrates in the lateral direction of the rear side wall, and
   the shaft member is inserted into the elastic ring.

* * * * *